United States Patent
Luo et al.

(10) Patent No.: US 7,599,413 B2
(45) Date of Patent: Oct. 6, 2009

(54) SELF-CONTAINED MODULE FOR INJECTING SIGNAL INTO SLAVE LASER WITHOUT ANY MODIFICATIONS OR ADAPTATIONS TO IT

(75) Inventors: Ningyi Luo, Fremont, CA (US); Sheng-Bai Zhu, Fremont, CA (US)

(73) Assignee: Pavilion Integration Corp., San Jose, CA (US)

( * ) Notice: Subject to any disclaimer, the term of this patent is extended or adjusted under 35 U.S.C. 154(b) by 47 days.

(21) Appl. No.: 11/419,478

(22) Filed: May 19, 2006

(65) Prior Publication Data
US 2007/0268940 A1 Nov. 22, 2007

(51) Int. Cl.
*H01S 3/098* (2006.01)
*H01S 5/022* (2006.01)

(52) U.S. Cl. .................. 372/32; 372/38.02; 372/43.01
(58) Field of Classification Search .................. 372/18, 372/32, 38.02, 43.01
See application file for complete search history.

(56) References Cited

U.S. PATENT DOCUMENTS

| | | | |
|---|---|---|---|
| 4,583,228 A | 4/1986 | Brown et al. | |
| 4,635,246 A * | 1/1987 | Taylor et al. | 398/79 |
| 4,932,030 A | 6/1990 | Chung | |
| 4,955,027 A | 9/1990 | Piper et al. | |
| 5,134,622 A | 7/1992 | Deacon | |
| 5,136,598 A * | 8/1992 | Weller et al. | 372/26 |
| 5,305,334 A | 4/1994 | Margalit et al. | |
| 5,398,256 A * | 3/1995 | Hohimer et al. | 372/94 |
| 5,434,882 A | 7/1995 | Chang | |
| 5,477,368 A * | 12/1995 | Eskildsen et al. | 398/147 |
| 5,577,058 A | 11/1996 | Kafka et al. | |
| 5,619,517 A | 4/1997 | Dixon | |
| 5,809,048 A | 9/1998 | Shichijyo et al. | |
| 6,275,250 B1 | 8/2001 | Sanders et al. | |
| 6,393,037 B1 | 5/2002 | Basting et al. | |
| 6,560,254 B2 | 5/2003 | Stamm | |
| 6,577,663 B2 | 6/2003 | Vogler | |
| 6,633,596 B1 | 10/2003 | Wulfmeyer et al. | |
| 6,721,344 B2 | 4/2004 | Nakao et al. | |
| 6,798,796 B2 | 9/2004 | Hiroshi et al. | |

(Continued)

FOREIGN PATENT DOCUMENTS

JP 11068202 3/1999

(Continued)

OTHER PUBLICATIONS

Siegman, Anthony "Lasers." Sausalito, CA: University Science Books, 1986.*

(Continued)

*Primary Examiner*—Minsun Harvey
*Assistant Examiner*—Michael Carter

(57) ABSTRACT

A self-contained module injects seeds into a slave laser for applications such as single mode or multimode injection seeding, master oscillator power amplifiers, regenerative amplifiers, optical parametric oscillators, Raman lasers, and LIDAR systems. The injection source provides a continuous wavelength sweeping for master-slave resonance to replace conventional cavity length control of the slave laser and phase locking schemes. The inventive module can be operated remotely as a separate unit or be packaged as a subsystem in the injection seeding system. The salve can be used as it is. Modifications of the slave laser and/or additional efforts are not needed.

5 Claims, 10 Drawing Sheets

U.S. PATENT DOCUMENTS

| | | |
|---|---|---|
| 6,867,904 B2 | 3/2005 | Ng et al. |
| 6,876,689 B2 | 4/2005 | Walling et al. |
| 6,906,309 B2 | 6/2005 | Sayyah et al. |
| 6,930,822 B2 | 8/2005 | Boggy et al. |
| 6,963,442 B2 | 11/2005 | Yap et al. |
| 6,963,591 B2 | 11/2005 | Tulloch et al. |
| 6,973,111 B2 | 12/2005 | Yamashita et al. |
| 6,985,508 B2 | 1/2006 | Knowles et al. |
| 6,989,906 B2 | 1/2006 | Sandercock |
| 2002/0080362 A1* | 6/2002 | Behroozi .................... 356/477 |
| 2002/0090011 A1* | 7/2002 | Pezeshki et al. ............... 372/20 |
| 2002/0186742 A1* | 12/2002 | Flint et al. .................... 372/70 |
| 2005/0201442 A1 | 9/2005 | Luo et al. |
| 2005/0243876 A1 | 11/2005 | Kung |
| 2006/0071846 A1 | 4/2006 | Yanagisawa et al. |
| 2006/0078011 A1 | 4/2006 | Lucht et al. |

FOREIGN PATENT DOCUMENTS

| | | |
|---|---|---|
| JP | 11121879 | 4/1999 |
| JP | 11214780 | 8/1999 |
| JP | 2000174371 | 6/2000 |
| WO | WO/2004/049056 | 6/2004 |

OTHER PUBLICATIONS

U.S. Appl. No. 11/170,911, filed Jun. 29, 2005, Luo, et al.

* cited by examiner

SELF-CONTAINED MODULE FOR INJECTING SIGNAL INTO SLAVE LASER WITHOUT ANY MODIFICATIONS OR ADAPTATIONS TO IT

FIELD OF THE INVENTION

This invention relates in general to control of laser output spectrum and wavelength, and in particular to injection locking of a slave laser without any modifications or adaptations to it. More particularly, the master-slave resonance is non-invasive, which is achieved by a self-contained injection source that is cost-effective and ready for direct use.

BACKGROUND OF THE INVENTION

Many applications require compact coherent sources of radiation with stable output, controlled wavelength and/or spectrum, short pulse width, TEM00 beam, and improved slope efficiencies. Injection seeding is a technology commonly employed to fulfill such requirements. By controlling the spectral properties of a power oscillator, referred to as slave or seeded laser, with an external low power output laser, referred to as master or seed laser or seeder, optical properties such as wavelength selection and control, spectrum stability, beam quality, as well as system efficiency and reliability, can be improved, while practical problems associated with high power lasers can be eliminated or reduced. These problems include nonuniform pump profiles, thermally induced optical distortions or thermal-lensing caused laser beam quality degradation, and degradation or damage of optical components or optical materials including lasing gain media or dielectric films. Injection seeding can also improve laser output power stability and reduce laser pulse to pulse jitter.

Conventional injection seeding is based on stabilized wavelength of the seed laser (master), active control of the resonance wavelength or longitudinal modes of the seeded laser (slave), and locked phase angle between the injected and output signals.

One way to stabilize seed laser wavelength is by use of filtered optical feedback. As an example, in U.S. Pat. No. 5,809,048, Shichijyo et al. used an external wavelength sensitive optical device and a birefringent Lyot filter for improving the wavelength stability. Another way to accomplish the wavelength stabilization of a semiconductor laser was disclosed in U.S. Pat. No. 4,583,228, wherein the drive current and the laser temperature were controlled by feedback signals derived from an external Fabry-Perot interferometer. Alternatively, the wavelength reference can be located within the oscillator, as described in U.S. Pat. No. 6,930,822. Wavelength stabilization can also be accomplished by movement of an optical element, e.g., rotation of a prism inside the laser, together with a signal processor. An example of such systems is given in U.S. Pat. No. 6,393,037. Other means of wavelength stabilization includes adjusting the temperature or angular tilt or spacing of an intracavity etalon; or adjusting the angle of a prism, a grating, a mirror, or a birefringent filter; or adjustment of the cavity length.

Active control of the resonance wavelength of a seeded laser oscillator to match the injected wavelength within the necessary tolerance typically requires modifications of the oscillator cavity, as well as complicated and expensive control systems and phase locking. Moreover, a plurality of optical elements including at least a set of lenses for beam shaping and at least one isolator for avoiding the backward traveling wave entering into the seeder, which otherwise may cause unstable laser operation or even damage the seeder, are required. This further increases the system complication and size. Furthermore, alignment and adjustment of optical systems are time consuming and require special skills.

In U.S. patent application Ser. No. 11/170,911, Luo et al. invented a method and a device employing continuous wavelength sweeping for master-slave resonance to replace stringent cavity length control and phase locking in injection seeding. This invention greatly reduces system complications and cost, and paves the way for development of a user-friendly system, requiring minimum efforts of end-users in various applications.

It would be valuable and, in fact, is an object of the present invention to provide for a self-contained injection source, which is cost-effective and ready for direct use without any additional efforts. In addition, it can be remotely used for injecting seeds into a slave, which is an ordinary optical oscillator without any modification or adaptation, for wavelength and spectrum control. Alternatively, the seeder can be built, as a drop-in package, into a seeded laser assembly, which is not modified otherwise. This capability is particularly useful for original equipment manufacture (OEM) applications.

SUMMARY OF THE INVENTION

It is therefore an object of the present invention to provide for a self-contained injection source, which is cost-effective and offers a user-friendly solution for injection seeding.

Viewed from a first aspect, our inventive module can be directly coupled, by means of free-space or fiber optics coupling, with the seeded laser without any structural modifications or additional efforts. The seeded laser can have a standing wave cavity or a traveling wave cavity, and can be pumped electrically or optically with end-pumped or side-pumped configurations.

Viewed from a second aspect, our inventive module is highly flexible. It can be operated at a broad range of wavelengths, for a variety of laser gain media, in single longitudinal mode (SLM) or multimode, in quasi-CW mode or pulsed mode, with a high or low repetition rate, depending on the actual applications.

Viewed from a third aspect, our inventive module can be placed into an injection seeding system, as a drop-in package, or remote from the system.

Viewed from a fourth aspect, our invention employs continuous wavelength sweeping for master-slave resonance. In particular, the injected photons repeatedly sweep over a range covering one or more longitudinal modes of the slave laser oscillator, which eliminates the needs for complicated cavity length control of the slave oscillator and phase locking between slave and master oscillators.

Viewed from a fifth aspect, continuous wavelength sweeping is accomplished through periodic variation of the seed laser drive current, in particular, through a radio frequency (RF) modulated drive current applied to the seed source.

Viewed from a sixth aspect, our inventive injection source can be applied to an ordinary free space laser oscillator, a fiber laser, an amplifier, an optical parametric oscillator, a Raman laser, or other systems, where reduction of the bandwidth and stabilization of the central wavelength are required.

The advantages and novel features of this invention will become more obvious from the detailed description below.

DETAILED DESCRIPTION OF THE PRESENT INVENTION

Figure 1A:
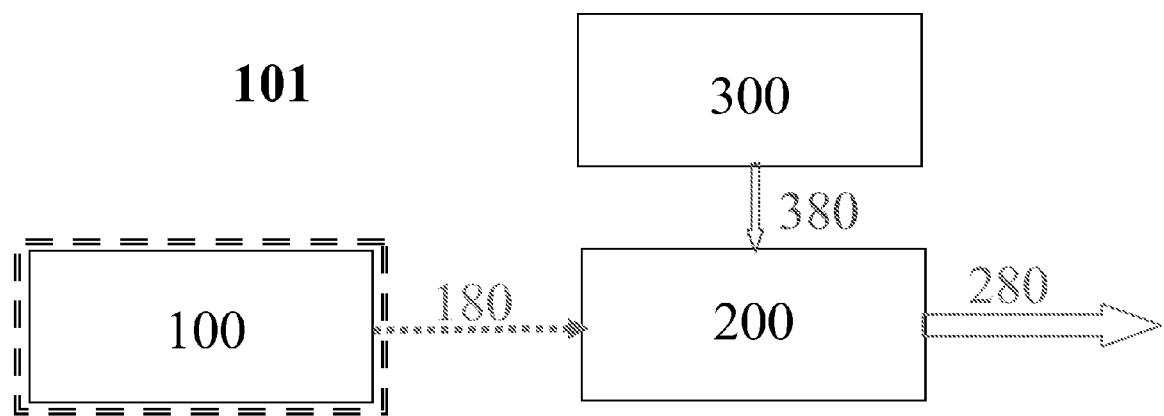
FIG. 1A graphically illustrates the inventive concept: a preferred configuration, wherein the signal from master is injected into slave through its back end and the laser output beam is extracted from the slave output coupler (front end).

Graphically illustrated in FIGS. 1A-1F is the inventive concept. In particular, the injection source 100, which is master, emits light 180 with continuous wavelength sweeping over a range covering the desired output wavelength of the seeded laser 200, which is slave. Other operational parameters of the injection source including the power/energy, spectral width, spatial mode, pulse width, repetition rate are so determined as to meet the specified requirements of the slave laser output. Advantageously, the injection source 100 can be directly coupled, by means of free-space or fiber optics coupling, to the seeded laser 200, which can be left as-is, there is no need for any modifications or additional efforts to it. Accompanied with the injection beam 180 is a pumping flux 380 generated from a pump source 300. The pumping flux 380, which can be electrical or optical energy or any other mechanism that transfers energy into the gain medium, creates population inversion in the seeded laser 200, wherein stimulated emission takes place. For optical pumping, the pump source 300 can be a laser diode or diode arrays or VCSEL arrays or LED arrays, based on an end-pumped configuration or a side-pumped configuration. For a side-pumped configuration, a diffusion chamber is preferably employed. Depending on the actual optics design, the laser output 280 can be extracted from the seeded laser 200 or from the injection source 100.

With reference to FIG. 1A, in which the signal emitted from the inventive module 100 is injected into the seeded laser 200 through its back end, which typically comprises a highly-reflective mirror. The laser beam 280 with controlled spectrum and wavelength is extracted from the output coupler (front end) of the seeded laser, keeping the propagation direction unchanged.

Alternatively, the injection seeding beam 180 can enter the seeded laser 200 through its front mirror (output coupler) having lower reflectivity. One such configuration is graphically illustrated in FIG. 1B, wherein the output laser beam 280 does not change its propagation direction when it passes through the inventive module.

Figure 1B:
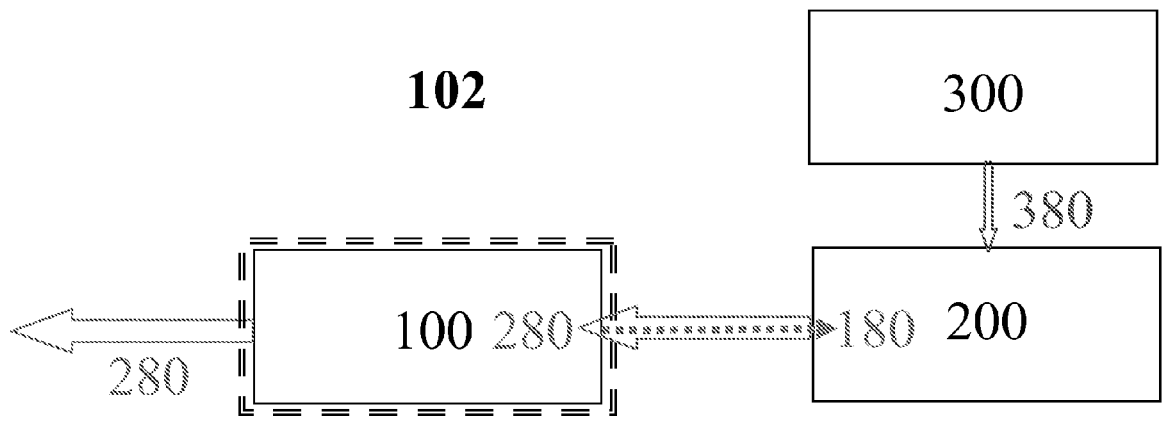
FIG. 1B graphically illustrates the inventive concept: another preferred configuration, wherein the signal from master is injected into slave through its front end and the laser output beam is extracted from the inventive module, keeping the propagation direction unchanged.
Figure 1C:
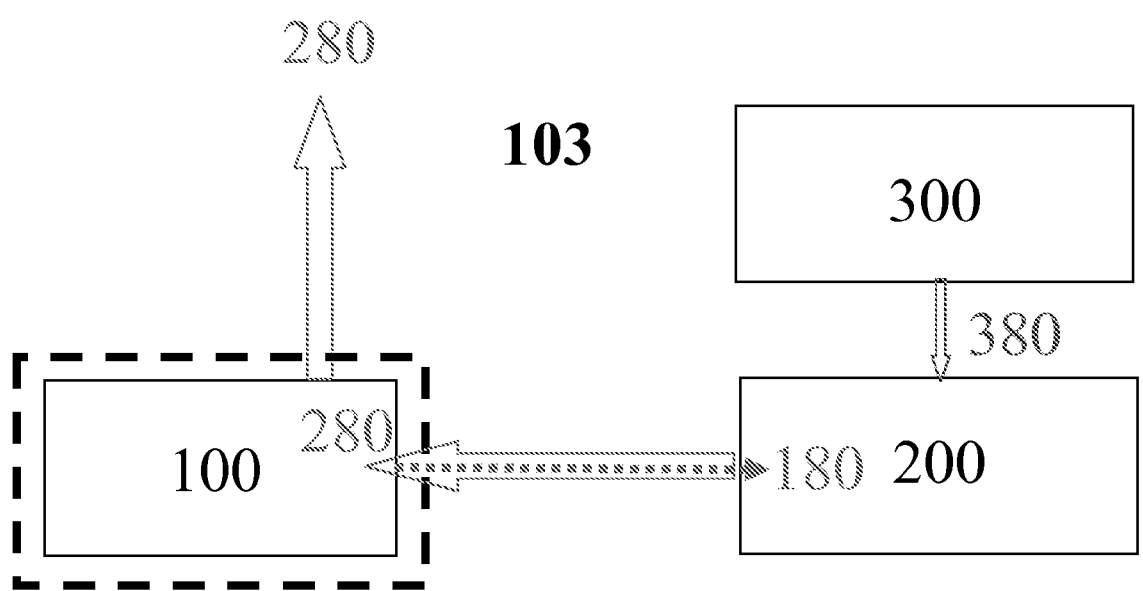
FIG. 1C graphically illustrates the inventive concept: another preferred configuration, wherein the signal from master is injected into slave through its front end and the laser output beam is extracted from the inventive module with a rotated propagation direction.

FIG. 1C shows another preferred configuration, which is similar to the one illustrated in FIG. 1B, except that the propagation direction of the beam 280 is rotated by a degree such as 90°.

Figure 1D:
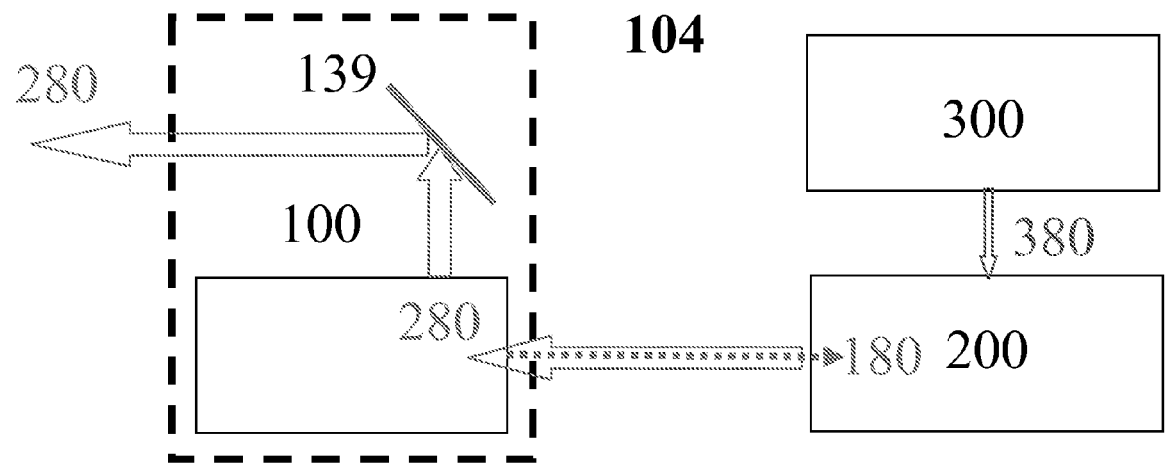
FIG. 1D graphically illustrates the inventive concept: another preferred configuration, wherein the signal from master is injected into slave through its front end and the laser output beam is extracted from the inventive module, keeping the propagation direction unchanged but shifted by a displacement.

Another similar configuration is schematically shown in FIG. 1D. After passing through the inventive module 100, the laser output beam 280 maintains its propagation direction but is shifted by a predefined displacement. This shift can be achieved by a reflector 139, which is, preferably, highly reflective to the seeder wavelength.

Figure 1E:
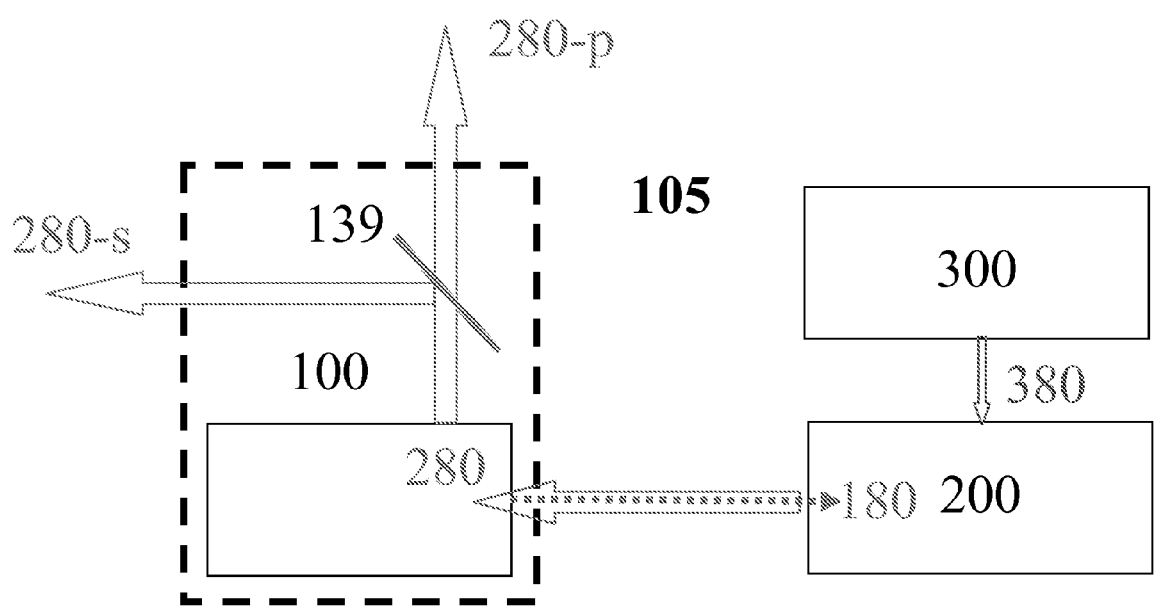
FIG. 1E graphically illustrates the inventive concept: another preferred configuration, wherein the signal from master is injected into slave through its front end and the laser output beam is split into two components with two different propagation directions, both are extracted from the inventive module.

By the use of a mirror 139 with polarization-sensitive coatings, as shown in FIG. 1E, the beam 280 can be split into two components, respectively labeled as 280-p and 280-s, with mutually orthogonal polarizations and propagation directions.

Figure 1F:
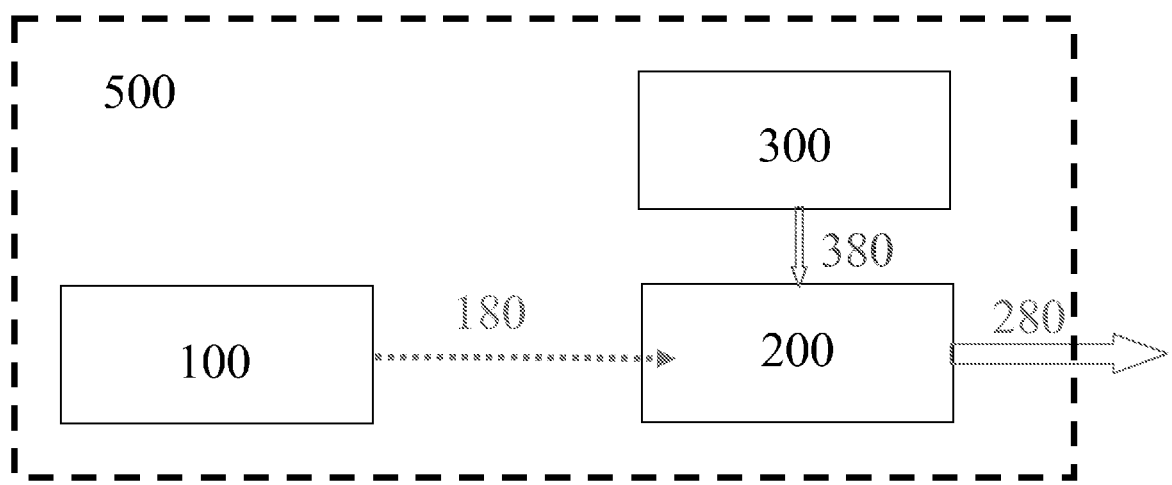
FIG. 1F graphically illustrates the inventive concept: another preferred configuration, wherein the inventive self-contained module, as a drop-in package, is placed into an injection seeding system.

The seeded laser 200 can be constructed as a standing-wave oscillator or a traveling-wave oscillator. Our inventive injection source 100 can be a separate unit for remote control of the slave operation, as illustrated in FIGS. 1A-1E, or a drop-in package, which can be placed inside the injection seeding system 500, as illustrated in FIG. 1F. Of course, the injection seeding system can be configured in a variety of ways such as those depicted in FIGS. 1A-1E to meet different requirements of various applications.

It should be pointed out that the gain medium of the seeded laser 200 can be solid-state, liquid (dye), or gas (low density) including excimer. It should also be mentioned that our inventive teachings are not limited to injection locking of the slave oscillator wavelength. Other applications requiring wavelength control such as master oscillator power amplifier (MOPA), regenerative amplifier, optical parametric oscillation (OPO), and Raman scattering are available without departure from our inventive principle. In OPO applications, two seeders may be used to individually control spectral line-widths of the pump laser and the signal or the idler. Furthermore, the inventive self-contained module can be employed to seed a slave laser with intracavity or extracavity nonlinear frequency conversion such as harmonic generation or with passive or active Q-switch elements for high pulse power.

Figure 2:
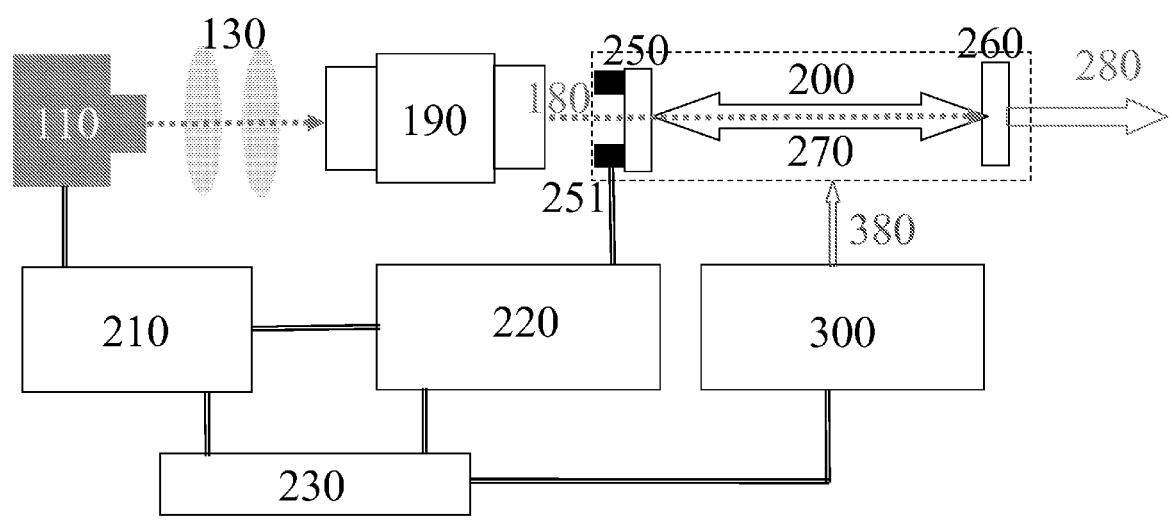
FIG. 2 is a schematic of an injection seeding system according to the prior art.

The merit of our inventive concept can be best understood by a comparison with the prior art. A typical injection seeding system according to the prior art is shown in FIG. 2. The system is composed of a master laser 110 to emit photons (optical seeds)—seed laser, a set of beam shaping optics 130, an optical isolator 190, a slave laser 200 to be controlled by the injected seeds—seeded laser, a pump source 300, phase detection system 230, and electronic control systems 210 and 220. The seed laser 110 emits light 180, which is focused and shaped by the optics element 130, to seed the slave laser 200. The isolator 190, typically consisting of a Faraday rotator and a polarizer, is for protecting the seed laser from interference or damage from optical power generated by the slave laser. The cavity length of the slave laser 200 is stringently controlled by a mechanism 251, which can be a piezoelectric translator (PZT) or a magneto-electric device. The cavity length control mechanism 251 is attached to the mirror 250 to actively adjust the distance between mirrors 250 and 260 according to the feedback signal relative to the reference. Said feedback signal is generated from the phase detector 230 and is amplified in the control system 220, which, together with the control electronics 210 for the seeder, drives phase-locking between the seed laser 110 and the seeded laser 200. Evidently, the injection seeding system constructed according to the prior art is very complicated and expensive. It also requires considerable efforts from skillful workers for optimal performance. In addition, it does not always result in robust seeding operation.

Figure 3A:
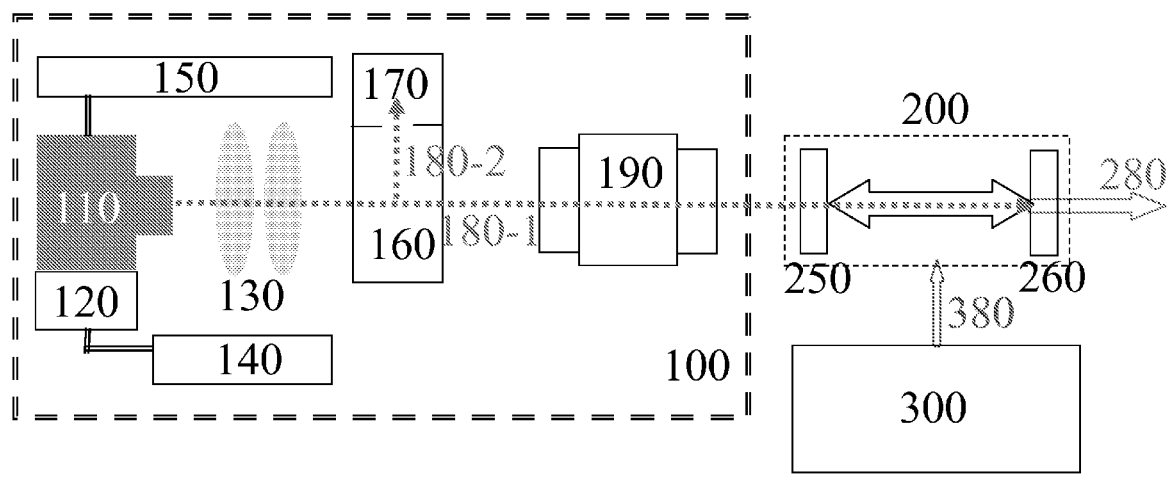
FIG. 3A is a schematic of a self-contained injection source constructed according to the present invention, wherein the signal from master is injected into slave through its back end and the laser output beam is extracted from the slave output coupler (front end).

A schematic representation of a seeding source module constructed in accordance with the present invention is hereby given in FIG. 3A. For explanation, a seeded laser 200 is displayed as well. Advantageously, the seeded laser is simply an ordinary optical oscillator. Neither modification nor adaptation is made. The cavity mirrors 250 and 260 can be separate elements or dielectric coatings deposited on the end surfaces of the gain medium. The coupling between the seeder and the seeded laser is purely optical and is achieved by means of free-space or optical fiber.

As a preferred embodiment, the inventive seeding source module 100 comprises a laser 110 to emit photons (optical seeds)—seed laser, a thermoelectric controller (TEC) 120, a set of beam shaping optics 130, a beam splitter 160, a photoelectric-conversion device such as photodiode 170 for monitoring laser output 180, a mechanism such as an optical isolator 190 for unidirectional travel of the laser beam in the system, and electric control circuit boards 140 and 150, respectively, for controlling the TEC 120 and the seed laser 110. The electric control circuit boards 140 and 150 can be separated from each other or integrated together. Advantageously, the seed laser 110 is a laser diode, which is energized by an RF modulated drive current generated from the circuit 150. As the drive current periodically varies with time, the wavelength of the light 180 emitted from the seed laser 110 dithers, which results in a continuous wavelength sweeping profile. As can be appreciated by those skilled in the art, the seed laser 110 is not restricted to a laser diode. It can be other light sources producing continuous wavelength sweeping over a range covering one or more longitudinal modes of the seeded laser.

Another advantage of the configuration shown in FIG. 3A relates to the automatic power control system. The photoelectric-conversion device such as photodiode 170 receives light only from the front facet of the laser diode 110. This greatly reduces optical noise associated with fluctuations in the ambient temperature and unwanted optical feedback. High-quality optical output from seeder (master) is critical to achieve stable output from the seeded (slave) laser.

As can be understood by those skilled in the art, the mechanism 190 is for preventing interference or damage to the seed laser due to fed-back light. It can be accomplished by one or more optical isolator(s) including fiber optic isolator(s), or other optical elements characteristic of polarization discrimination such as birefringent crystals for separation of the e-ray and o-ray through the walk-off effect, or polarization beam-splitter prisms, or electro-optic devices, or acousto-optic devices, or a combination thereof. Optical isolators can also be polarization-independent or of a composite type. A polarization-independent isolator can be composed of a 45° Faraday rotator, which is interposed between two wedge-shaped birefringent plates.

Figure 3B:
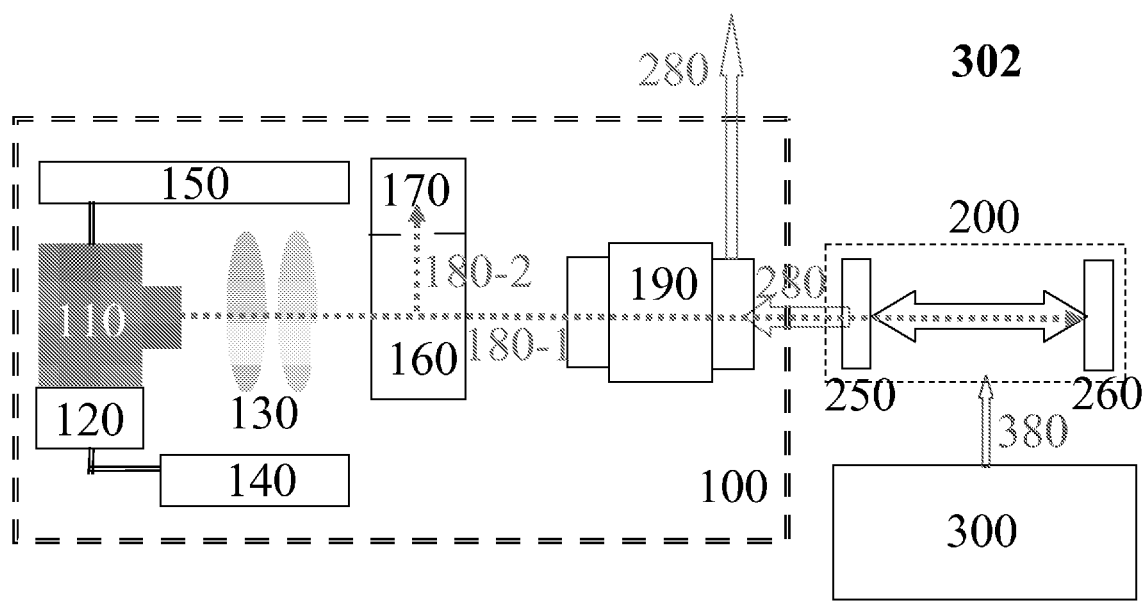
FIG. 3B is a schematic of a self-contained injection source constructed according to the present invention, wherein the signal from master is injected into slave through its front end and the laser output beam is extracted from the inventive module with a rotated propagation direction.

While the configuration shown in FIG. 3A produces laser beam 280, which is extracted through the output coupler of the seeded laser, other coupling mechanisms preferably depicted in FIGS. 1B-1E can be employed as well. One exemplary configuration is illustrated in FIG. 3B, which produces laser beam 280 extracted from the inventive module with a rotated propagation direction. In another example, as shown in FIG. 3C, the laser output beam 280 is split by a polarization-sensitive mirror 139 into two components, which are respectively labeled as 280-p and 280-s, with mutually orthogonal polarizations and propagation directions.

Figure 3C:
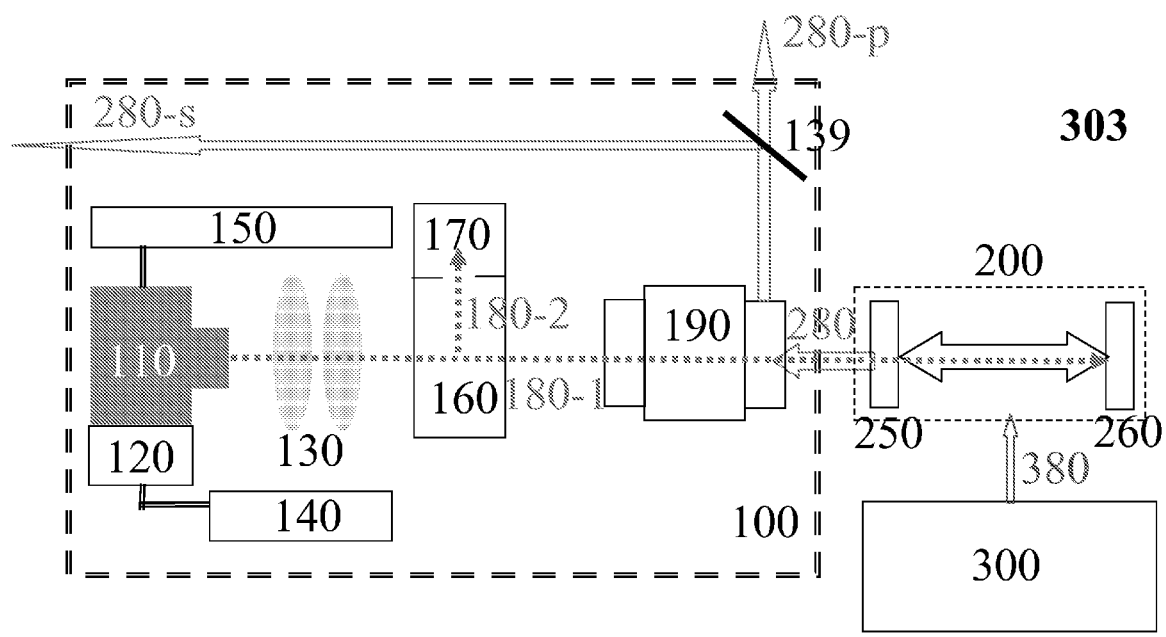
FIG. 3C is a schematic of a self-contained injection source constructed according to the present invention, wherein the signal from master is injected into slave through its front end and the laser output beam is split into two components with two different propagation directions, both are extracted from the inventive module.

It should be pointed out that the configurations shown in FIGS. 3A-3C are for exemplification and for illustration only. There may be many different embodiments and/or alternatives adaptable to various applications.

What is claimed is:

1. A self-contained module enabling optical control of a slave laser with randomly fluctuating optical cavity length, said module comprising an electrically-excited semiconductor laser called seed laser or seeder;

a thermoelectric controller in thermal contact with the seeder, said thermoelectric controller is controlled by a TEC circuit and is adjusted at a temperature where the seeder emits optical seeds of wavelength in the vicinity of the randomly fluctuating resonant wavelength of the slave laser, the TEC circuit further maintains the temperature during the operation of the seeder;

an electric circuit to generate electric current for driving the seed laser, wherein the electric current periodically varies with time in radio frequency such that the seeder emits light with a narrowband spectrum at any instant of time, while the central wavelength (peak) of the narrowband spectrum changes as the drive current varies, the waveform, amplitude, and rate of the time-varying current are so selected that the seeder output wavelength continuously sweeps over a range covering one or more randomly fluctuating longitudinal mode(s) of the slave laser and the sweeping is so rapid that buildup of longitudinal modes in the slave laser is not completed in a sweeping cycle, whereby the wavelength of the injected optical seeds can always match a longitudinal mode of the slave laser when the slave laser builds lasing mode in response to a trigger;

optical elements for controlling propagation direction of light; and a housing containing the seeder and its driving circuit, the thermoelectric controller and the TEC circuit, and the optical elements, wherein the shell of the housing is open with at least one hole allowing light propagation between the interior and exterior of the module, wherein the optical elements shape and direct the optical seeds emitted from the seeder to a hole of the shell, wherein the optical elements direct any lights from outside of the housing away from the seeder and to one or more hole(s) of the shell for exit, wherein the optical elements provide unidirectional optical coupling between the seeder and outside of the housing;

such that coupling between the seeder and the seeded slave laser is purely optical whereby neither modifications nor additional adaptations of the seeded slave laser are required to guarantee frequency match between the injected optical seeds and the slave laser longitudinal modes (non-invasive master-slave resonance);

whereby phase locking between the injected and the output signals is not necessary;

whereby active cavity length control of the slave laser oscillator is not required and the optical cavity length of the seeded slave laser is allowed to randomly fluctuate with time.

2. A module as of claim 1, wherein:
   said optical elements further comprising: one or more optical isolator(s) including fiber optic isolator(s).

3. A module as of claim 1, further comprising a beam splitter.

4. A module as of claim 1, further comprising an optic fiber in connection to a hole on the housing shell.

5. A module as of claim 1, further comprising an automatic power control system.

* * * * *